United States Patent [19]

White et al.

[11] Patent Number: 5,082,616
[45] Date of Patent: Jan. 21, 1992

[54] FILM BLOWING PROCESS

[75] Inventors: James L. White, Akron, Ohio; Tao Nie, Richmond, Va.

[73] Assignee: Edison Polymer Innovation Corp., Broadview Heights, Ohio

[21] Appl. No.: 603,814

[22] Filed: Oct. 25, 1990

[51] Int. Cl.$^5$ .............................................. B29C 55/28
[52] U.S. Cl. ................................... 264/567; 264/569; 264/331.14
[58] Field of Search ............... 264/567, 569, 563, 564, 264/176.1, 127, 331.14, 331.17; 425/326.1, 72.1; 526/255

[56] References Cited

U.S. PATENT DOCUMENTS

| | | | |
|---|---|---|---|
| 2,979,777 | 4/1961 | Goldman | 264/569 |
| 3,217,073 | 11/1965 | Olson et al. | 264/ |
| 3,278,663 | 10/1966 | Graham | 264/567 |
| 3,456,044 | 7/1969 | Pahlke | 264/567 |
| 3,691,264 | 9/1972 | Asahina | 264/ |
| 3,869,534 | 3/1975 | Yoshikawa et al. | 264/ |
| 3,878,274 | 4/1975 | Murayama et al. | 264/ |
| 3,925,339 | 12/1975 | Ishii et al. | 260/ |
| 3,931,446 | 1/1976 | Murayama et al. | 428/ |
| 4,290,983 | 9/1981 | Sasaki et al. | 264/ |
| 4,298,719 | 11/1981 | Mizuno et al. | 526/ |
| 4,481,158 | 11/1984 | Georlette et al. | 264/127 |
| 4,656,234 | 4/1987 | Murayama et al. | 264/563 |
| 4,667,001 | 5/1987 | Mizuno | 264/176.1 |
| 4,670,527 | 6/1987 | Mizuno | 264/176.1 |
| 4,731,288 | 3/1988 | Mizuno et al. | 264/331.14 |

FOREIGN PATENT DOCUMENTS

| | | | |
|---|---|---|---|
| 60-64827 | 4/1985 | Japan . | |
| 62-286720 | 12/1987 | Japan | 264/567 |
| 936398 | 9/1963 | United Kingdom . | |

OTHER PUBLICATIONS

Kang, White and Cakmak, International Polymer Processing, vol. 5, Issue 2, p. 62.

Primary Examiner—Jeffery Thurlow
Attorney, Agent, or Firm—D. Peter Hochberg; Mark Kusner; Louis J. Weisz

[57] ABSTRACT

A method for preparing biaxially oriented poly(vinylidene fluoride) films involving the addition of a minor amount of a polymer miscible with PVDF, particularly poly(methyl methacrylate), to the poly(vinylidene fluoride) to form a blend exhibiting reduced crystallinity and reduced rates of crystallization during the film forming process. The low crystallinity permits the blend to be subsequently formed into biaxially oriented film in a double-bubble tubular film extrusion process by retarding the rate of crystallization in the first bubble, thereby permitting formation of the second bubble without rupture. The films thus formed possess piezoelectric and other desirable characteristics.

11 Claims, 1 Drawing Sheet

FILM BLOWING PROCESS

TECHNICAL FIELD

This invention relates to an improved film blowing process. More particularly, this invention relates to the manufacture of biaxially stretched poly(vinylidene fluoride), PVDF, films by means of a tubular film extrusion process. Specifically, this invention relates to the retardation of crystallinity of poly(vinylidene fluoride) in extruded films by blending the PVDF with miscible polymers, particularly poly(methyl methacrylate), so that the films can be biaxially stretched using a "double-bubble" tubular film blowing technique.

BACKGROUND OF THE INVENTION

Poly(vinylidene fluoride) polymers have found broad application as insulation for high-temperature wire, for tank linings, in protective paints and coatings, as encapsulants, in films, and for a variety of other uses. More recently, with the development of polymer electrets, interest in poly(vinylidene fluoride) films has grown even greater, particularly since the films have been show to have piezoelectric properties of a high order, as well as to display pyroelectric characteristics.

Commonly, PVDF films have been prepared by a film casting process using a "coat hanger" die, coupled with a second processing stage involving stretching of the film on a tentering frame. The second stage involves a solid state stretching, either uniaxially or biaxially, carried out at a desired temperature below the film's melting temperature. Films produced by the technique described generally exhibit both superior quality and good uniformity. However, the tentering film process has the disadvantage of requiring more initial capital investment than a "blown film process", described in the following, because of the complexity of the equipment required.

The alternative technique of tubular film extrusion, which allows the film being processed to be simultaneously biaxially stretched, i.e., both longitudinally and transversely, was developed some years ago. The technique involves the extrusion of film from a circular die, and its subsequent orientation in a longitudinal direction through "drawing" of the film by means of a film wind-up apparatus. The drawing results due to the fact that the wind-up occurs at a faster speed than the film extrusion rate, the difference being expressed as the "draw down ratio". During the process of extrusion, air is also introduced into the forming tube, expanding its transverse cross-section, thus providing orientation transverse to the film's longitudinal axis, an expansion known as the "blow-up ratio".

Films produced by the blown film process, however, are generally insufficiently oriented to provide good physical properties. In order to provide adequate orientation during the blown film process, therefore, a second stage solid state stretching is sometimes applied to the initially blown film. This dual stretching operation is termed a "double bubble tubular film process"; and it involves the reheating and reinflation of the tubular film after it has been collapsed following its initial formation.

PVDF can readily be processed by the single bubble blown film process employing a variety of drawn down and blow-up ratios. However, when an attempt is made to additionally stretch the oriented film thus obtained in two directions by means of a second bubble-forming procedure, the film is easily torn and broken during the added stretching. Furthermore, during the second stretching, the resulting film commonly "necks", i.e., its thickness becomes extremely uneven, a phenomenon occurring over the entire surface of the film. In addition, and unlike other crystalline polymers, necking in polyvinylidene fluoride does not show any tendency to disappear, even when the stretching temperature is elevated almost to the melting point of the film.

The described difficulty in further stretching is caused by the high crystallinity of PVDF, its extremely high crystallization rate, and the high intermolecular cohesive force of the molecules.

BRIEF DESCRIPTION OF THE INVENTION

In view of the preceding, therefore, it is a first aspect of this invention to prepare biaxially oriented films.

It is a second aspect of this invention to provide films from blends of poly(vinylidene fluoride) and polymers miscible with PVDF, particularly poly(methyl methacrylate), that are oriented along two axes at 90° to each other.

An aspect of this invention is also to provide a more efficient, less costly method for preparing biaxially oriented polyvinylidene fluoride films.

An additional aspect of this invention is to provide a way in which to reduce the rate at which poly(vinylidene fluoride) films form crystalline structures.

A further aspect of this invention is to furnish a method for retarding crystallization of PVDF in the initial bubble formed during a double-bubble tubular film extrusion.

Still another aspect of this invention is to provide a method for preparing films by the double-bubble process from polymer blends containing poly(vinylidene fluoride) and a polymer miscible therewith that retards crystal formation in the poly(vinylidene fluoride).

The preceding and other aspects of the invention are provided by a process for preparing biaxially oriented film in a tubular film extrusion process from a blend of poly(vinylidene fluoride) and at least one other polymer miscible therewith comprising: extruding said blend from an annular die to form a tubular extrudate; cooling said extrudate and injecting a gas therein to form a first bubble while simultaneously drawing said bubble; collapsing said bubble; heating said collapsed bubble and injecting a gas therein to form a second bubble while simultaneously drawing said second bubble, thereby forming biaxially oriented film.

The preceding and additional aspects of the invention are provided by a biaxially oriented film comprised of poly(vinylidene fluoride) and poly(methyl methacrylate) formed by the process of the preceding paragraph.

The preceding and further aspects of the invention are provided by a process for forming biaxially oriented film in a continuous tubular film extrusion process from a blend of poly(vinylidene fluoride) and a second polymer miscible therewith comprising: continuously extruding said blend from an annular die to form a tubular extrudate; cooling said extrudate and injecting air therein to form a first bubble while simultaneously drawing said bubble along its longitudinal axis; continuously collapsing said bubble with nip rolls; heating said collapsed bubble and injecting air therein to continuously form a second bubble while simultaneously drawing said second bubble, thereby continuously forming biaxially oriented film, wherein said second polymer constitutes from about 15% to about 30%, on a weight basis, of said blend, while the balance of said blend is poly vinylidene fluoride.

The preceding and still other aspects of this invention are provided by a biaxially oriented film comprised of poly(vinylidene fluoride) and poly(methyl methacrylate) formed by the process of the preceding paragraph.

BRIEF DESCRIPTION OF THE DRAWINGS

The invention will be better understood when reference is had to the following Figures, in which like numbers refer to like parts, and in which.

DETAILED DESCRIPTION OF THE INVENTION

Figures 1, 1A:
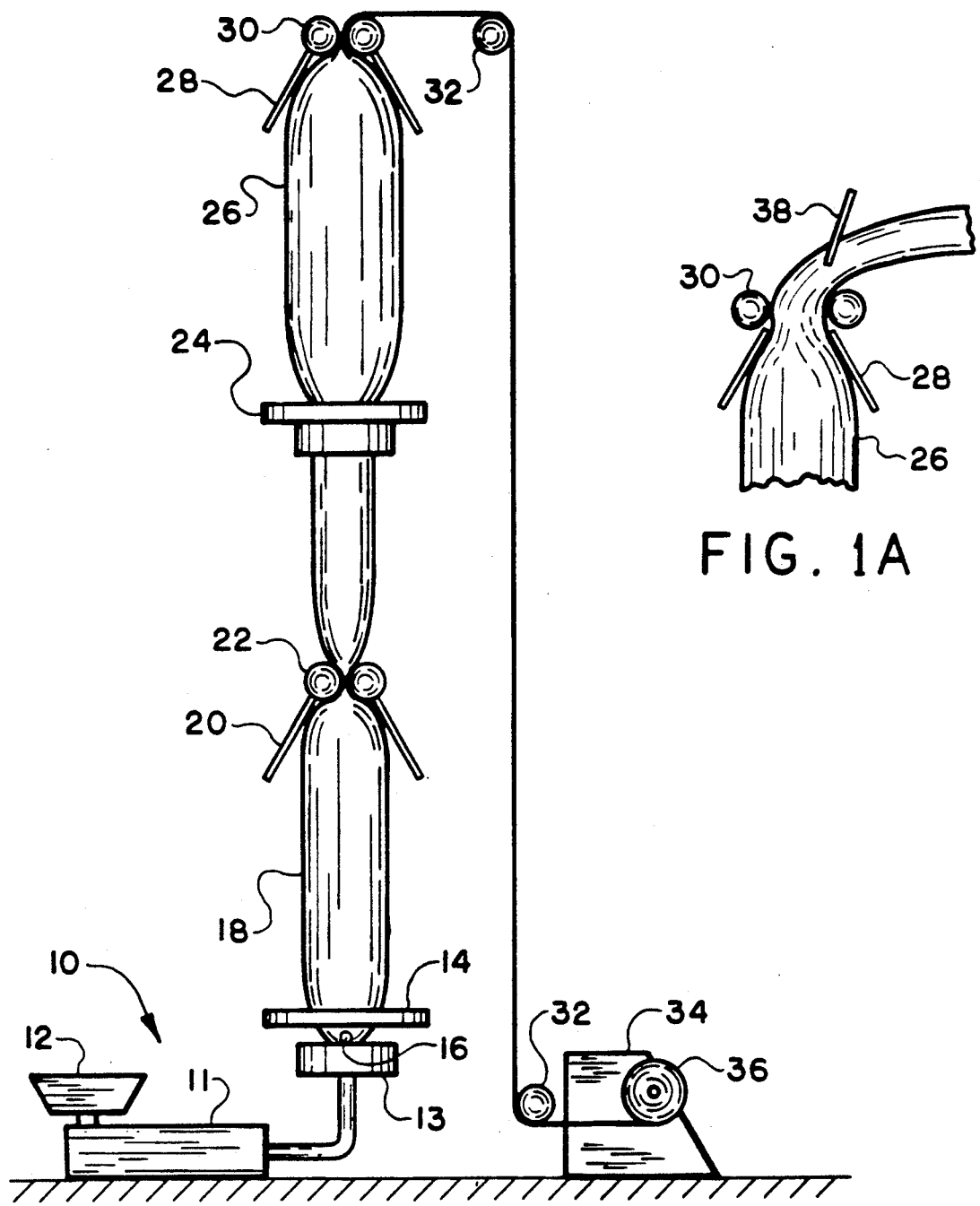
FIG. 1 is a schematic representation of a double-bubble tubular film extrusion apparatus of the type contemplated by the invention.
FIG. 1A is a partial view of a schematic representation of a double-bubble tubular film extrusion apparatus showing the introduction of inflation air into the second bubble.

The process of the invention involves the discovery that the blending of poly(vinylidene fluoride) with polymers miscible therewith such as, for example, poly(methyl methacrylate) allows the resulting blend to be processed into film using a double-bubble tubular film extrusion process.

The double-bubble process has commonly been used to prepare biaxially oriented films from polymers such as, for instance poly(vinylidene chloride), Nylon-6, poly(ethylene terephthalate), and other polymeric materials. However, when an attempt is made to use the double-bubble process to prepare poly(vinylidene fluoride) films, as previously refered to, the material's rapid crystallization rate and its high crystallinity tend to cause the film produced to "neck" during its extension, i.e., to display a high degree of unevenness in the film surface, an unevenness which has no tendency to disappear even after the stretching temperature is elevated almost to the melting point of the film. Thus the film is easily broken, particularly during formation of the second bubble.

Surprisingly, however, it has been found that polymers miscible with the poly(vinylidene fluoride) polymer, result in the dilation of the latter, moving the PVDF polymer chains' apart. Such effect not only reduces the crystallization rate of the PVDF polymer, but lowers its melting point as well. Consequently, the polymer blend is readily processed to form films with the double-bubble process.

While the addition of the miscible resin poly(methyl methacrylate) to poly(vinylidene fluoride) has previously been suggested, for example, in U.S. Pat. No. 4,290,983, the influence of the resin in dilating the poly(vinylidene fluoride) polymer and reducing its rate of crystallization was not recognized, as is shown by the fact that despite the notable advantages of the double-bubble process, the only processing procedure suggested in the Patent is the machine drawing of melt-extruded, molded sheets.

Japanese Patent No. 60-6482 also shows the use of poly(methyl methacrylate) blended with poly(vinylidene fluoride) in cast films which are subsequently biaxially stretched. However, again no suggestion is made that the blend can be fashioned into a film by a double-bubble process, as opposed to machine stretching.

U.S. Pat. No. 3,691,264 also shows poly(vinylidene fluoride) blended with poly(methyl methacrylate), and again there is no recognition of the advantages of such blends in connection with the double-bubble process.

The omission of any suggestion that double-bubble processing may be used for processing the poly(vinylidene fluoride) blends described in the patents is not surprising in view of poly(vinylidene fluoride)'s know propensity to crystallize rapidly, and the fact that it is also well known that the double-bubble procedure cannot be successfully used with polymers prone to crystalline interference; for example, it cannot be used with polyethylene, polycarbonates, or various other polymers.

Referring now to FIG. 1, the double-bubble process involves an apparatus which includes an extruder, generally 10, in association with a hopper 12 into which the blended poly(vinylidene fluoride) and a miscible polymer such as poly(methyl methacrylate) are added. The resins pass through the barrel of the extruder 11, being heated substantially to their melting point therein, and are then extruded through an annular die 13. The extrudate leaving the die is inflated by gas, for example, air introduced from an orifice 16 located within the die 13. The bubble 18 thus formed passes through an annular ring 14 from which a stream of chilled air is directed inwardly so that it impinges upon the bubble. The bubble then proceeds upwardly to a collapsing frame 20, which terminates in nip rolls 22. The collapsing frame reduces the diameter of the bubble 18, directing it between the nip rolls 22 and upward to a hot-air ring 24 from which a stream of hot air or other suitable gas is blown against the second bubble 26, causing it to become heated. The tubular film continues upward, encountering a second collapsing frame 28 which directs the bubble through nip rolls 30, collapsing the bubble in the process. The thus-flattened film proceeds over idler roll 32, downward to another idler roll 32, after which it is wound on a film roll 36 rotated by winder 34.

To operate the apparatus, a gas such as air is temporarily introduced from the injector 16 into the tubular extrudate leaving die 13, forming the bubble 18. After the bubble is formed, the supply of air is shut off, being no longer needed since air is trapped within the bubble where it serves to inflate subsequent extrudate leaving the die. To initially inflate the second bubble 26, the nip rolls 30 are moved apart, as is better seen in FIG. 1A, and an injector 38 is inserted into the tubular film to introduce the bubble-inflating gas. Once the second bubble 26 has been inflated, the nip rolls 30 are moved back together, as shown in FIG. 1, trapping the air within the bubble. The air then serves to keep the bubble inflated as fresh tubular film rises from the nip rolls 22. The hot air ring 24 serves to heat the tubular material to a temperature that facilitates its blowing.

While the process direction of the double-bubble apparatus shown is vertical, with both the first and second bubbles being extruded upward, the bubbles can also be extruded vertically downward, or if desired, the second bubble can be blown in a horizontal position.

As stated, the addition of a miscible polymer such as poly(methyl methacrylate) to the poly(vinylidene fluoride) serves to move the poly(vinylidene fluoride) molecular chains apart in the molten state, and also lowers the temperature at which the poly(vinylidene fluoride) melts. The temperature reduction not only beneficially affects the poly(vinylidene fluoride) polymer by reducing heat-induced degradation, but the reduction lowers the temperature to which the blend must be heated both in the extruder, and by the hot air ring 24 to be successfully blown.

While poly(methyl methacrylate) is a preferred polymer, other polymers miscible with PVDF may also be employed including additional acrylates such as, for instance, poly(methyl acrylate), poly(ethyl acrylate), poly(ethyl methacrylate) and equivalent materials. Still additional useful polymers include poly(vinyl acetate), poly(vinyl methyl ketone), and others. Mixtures of such miscible polymers may also be employed.

The amount of the miscible polymer required to produce the effects noted has been found to be from about 15% to about 30% by weight of the miscible polymer, based on the total weight of the resulting blend. The addition of significantly more than such amount is undesirable, however, since the physical properties of the poly(vinylidene fluoride) can be detrimentally affected thereby.

Mixing of the blend may be accomplished in any of the ways well known in the art, for example, in twin screw extruders, roll mills, internal mixers, and other equivalent apparatus.

In order for the blend to possess properties that lend it to blowing in a double-bubble process, it is preferred that the poly(vinylidene fluoride) polymers making up the blend have a weight average molecular weight $\overline{M}_w$ of from about 330,000 to about 390,000. A suitable resin, for example, is that manufactured by Kureha Chemical Industry, Co., Ltd. and marketed by them as their resin 1300.

It has been found that miscible resins such as poly(methyl methacrylate) resins having a $\overline{M}_w$ of from about 110,000 to about 125,000 provide satisfactory results for purposes of the invention. In this regard, a suitable poly(methyl methacrylate) resin, for instance, is that sold by CYRO Industries under the trademark Acrylite H 12-03. In the case of both the poly(vinylidene fluoride) and the poly(methyl methacrylate) resins identified, products other than those specifically mentioned may, of course, also be used.

While the extrusion rate can vary, in the case of laboratory equipment, it will commonly be in the order of from about 900 cubic centimeters per hour, to about 1,000 cubic centimeters per hour, and the extrusion can be conducted by heating the blend to a temperature of from about 220° C. to about 240° C. In the case of industrial equipment, the extrusion rate may, of course, be much higher.

Stretching, and therefore, orientation of the film takes place in both the first and second bubbles. In the first bubble, the film is not completely stretched; consequently, the tensile strength of the film is not fully developed. In this regard, if an attempt were made to achieve full orientation of the film in both the transverse and longitudinal directions in the first bubble, the weak condition of the film would result in its rupture. As a result, the film is given a further stretch in the second bubble, completing the orientation and optimizing the properties of the film along both its axes.

As indicated, the film undergoes a stretch or "draw down" in both the first and second bubbles. The extent of the draw down is normally expressed as the ratio $V_L/V_O$, where V is the velocity of the extrudate or film, as the case may be, "O" referring to the velocity at the location of the die, while "L" refers to the velocity at the film take-up point.

In similar manner, the "blow up" ratio describes the extent to which the film has been transversely stretched and may be expressed as $R_L/R_O$, where R refers to the extrudate and bubble radii, and L and O have the meanings previously described.

Referring to the first bubble, if the draw down ratio is too low, insufficient longitudinal orientation is imposed on the film to prevent it from breaking. If the ratio is too high, however, the bubble is excessively oriented in the longitudinal direction, preventing processing of the second bubble without rupture.

With respect to the blow up ratio, if the ratio is too low, the bubble tends to be uniaxially oriented in the longitudinal direction, causing it to rupture during formation of the second bubble. Again, if the ratio is too high, the bubble cannot be blown in the second bubble.

Within such considerations, it has been found that a draw down ratio of from about 5/1 to about 20/1 defines a useful range for formation of the first bubble, a draw down ratio of about 10/1 to about 15/1 being preferred.

In regard to the blow up ratio of the first bubble, the ratio will ordinarily be controlled from about 1.1/1 to about 2/1, a ratio of about 1.5/1 to about 1.75/1 being preferred.

With respect to the second bubble, if the draw down ratio is too high, the bubble has a tendency to rupture; consequently, the draw down ratio is typically controlled at from about 1.1/1 to about 3/1. The blow up ratio normally is adjusted to be from about 2.0/1 to about 3.75/1.

With respect to the length of the bubbles, the first bubble will be long enough to assure complete solidification of the film before it is collapsed by the nip rolls 22, while the second bubble will be long enough to allow it to cool before it is collapsed by the second set of nip rolls 30. Typically, the second bubble will be cool enough to touch, i.e., around 50° C. by the time it reaches the nip rolls 30. The diameter of the bubble will depend upon such things as the diameter of the annular die from which the extrudate emerges, the blow up ratio, the structural details of the cooling and heating rings, and similar, practical considerations.

As previously indicated, the double-bubble apparatus is provided with a cooling ring 14, adjacent to the die 13. The purpose of the ring is to permit impingement of a stream of cool air on the emerging tubular extrudate in order to slow down its rate of crystallization, and therefore, to permit it to be more easily drawn without undergoing destructive rupture. It has been found that by controlling the temperature of the cooling air emerging from the ring at from about 10° C. to about 20° C., a satisfactory temperature quench and suitable control of crystallinity can be achieved.

To allow the tubular film to be blown into a second bubble, the film is heated by the hot air ring 24, the hot air emerging from the ring ordinarily being controlled at from about 100° C. to about 140° C. The double-bubble apparatus can also employ heating devices other than the hot air ring described with similar effect, in ways well known to the art.

In order to stabilize the film and to avoid its shrinkage, it is normally desirable to treat the finished film in an annealing process which may be carried out by heating the film to an elevated temperature and maintaining it in its heated condition for a period of time, for example, for about 5 minutes at 120° C.

The film produced from the poly(vinylidene fluoride)-miscible polymer blend is capable of exhibiting highly desirable piezoelectric characteristics. To produce such characteristics, the finished film is first "poled" by being heated above its glass transition temperature, for example, to about 100° C. in an electrical field, e.g., maintained at from about 60 kv to about 100 kv, and held under such conditions for a short period of time, for instance, from about 7 to about 10 minutes.

The following example, while not intended to be limiting in nature, is illustrative of the invention.

A poly(vinylidene fluoride) resin, Grade 1300 marketed by Kureha Chemical Industry Co., Ltd. is mixed with poly(methyl methacrylate), Acrylite H12-03 supplied by Cyro Industries, in a twin screw extruder in the weight ratio of 8:2, respectively. The blend is extruded at a temperature of about 215° C. into a water bath and pelletized. The pellets are thereafter dried for 24 hours at 80° C. in a vacuum oven before being used in a double-bubble film process.

The double-bubble blown film process is that shown schematically in FIG. 1, in which a 20 mm, ¾ inch Killion screw extruder with a bottom fed annular die is employed. The die has an inner diameter of 28.57 mm, and an outer diameter of 31.24 mm. The extrudate from the annular die proceeds vertically upward to the first set of nip rolls. Air under pressure is injected into the tubular extrudate from an orifice located in the die until the first bubble has been formed. The bubble is then quenched with cooling air blown through a cool air ring operated with air adjusted to a temperature of about 20° C. The solidified film continues upward to the first set of nip rolls where it is collapsed, subsequently heated by a hot air ring in which the air is controlled at about 120° C., and reblown to form a second bubble.

The extrusion rate employed is 950 cm$^2$/hour, and the extrusion temperature is controlled at 230° C. The draw down ratio used in the first bubble is about 12/1, and the blow up ratio is about 1.5/1. The draw down ratio in the second bubble is adjusted to 2/1, while the blow up ratio is controlled at 3/1. Stretching in the second bubble is assisted by hot air heated to 120° C. emanating from the hot air ring.

The film produced is shown to be biaxially oriented, and to display superior transparency.

While in accordance with the patent statutes, a preferred embodiment and best mode has been presented, the scope of the invention is not limited thereto, but rather is measured by the scope of the attached claims.

What is claimed is:

1. A process for forming biaxially oriented film in a tubular film extrusion process from a blend of poly(vinylidene fluoride) and at least one other polymer miscible therewith comprising:
   extruding said blend from an annular die to form a tubular extrudate;
   cooling said extrudate and injecting a gas therein to form a first bubble while simultaneously drawing said bubble;
   collapsing said first bubble;
   heating said collapsed bubble and injecting a gas therein to form a second bubble while simultaneously drawing said second bubble, thereby forming biaxially oriented film.

2. A process according to claim 1 wherein said other polymer is a member selected from the group consisting of poly(methyl methacrylate), poly(ethyl methacrylate), poly(methyl acrylate), poly(ethyl acrylate), poly(vinyl acetate), and poly(vinyl methyl ketone).

3. A process according to claim 1 wherein said other polymer is poly(methyl methacrylate) and said other polymer constitutes from about 15% to about 30%, on a weight basis, of said blend.

4. A process according to claim 3 wherein said cooling is carried out by contacting said extrudate with a stream of cool air.

5. A process according to claim 4 wherein said air has a temperature of from about 10° C. to about 20° C., and said air emanates from a cooling ring through which said extrudate passes.

6. A process according to claim 3 wherein said heating is carried out by contacting said second bubble with a stream of heated air.

7. A process according to claim 6 wherein said air is heated to from about 100° C. to about 140° C. and emanates from a heating ring through which said second bubble passes.

8. A process according to claim 3 wherein the draw down ratio of said first bubble is from about 5:1 to about 20:1, and that of said second bubble is from about 1.1:1 to about 3:1, while the blow up ratio of said first bubble is from about 1.5:1 to about 1.75:1, and that of said second bubble is from about 2:1 to about 3.75:1.

9. A process according to claim 3 in which the weight average molecular weight of said poly(vinylidene fluoride) is from about 330,000 to about 390,000, while that of the poly(methyl methacrylate) is from about 110,000 to about 125,000.

10. A process for forming biaxially oriented film in a continuous tubular film extrusion process from a blend of poly(vinylidene fluoride) and a second polymer miscible therewith comprising:
    continuously extruding said blend from an annular die to form a tubular extrudate;
    cooling said extrudate, and injecting air therein to form a first bubble while simultaneously drawing said bubble along its longitudinal axis;
    continuously collapsing said bubble with nip rolls;
    heating said collapsed bubble and injecting air therein to continuously form a second bubble while simultaneously drawing said second bubble, thereby continuously forming biaxially oriented film,
    wherein said second polymer comprises from about 15% to about 30%, on a weight basis, of said blend, while the balance of said blend comprises poly(vinylidene fluoride).

11. A process according to claim 10 wherein said second polymer is poly(methyl methacrylate).

* * * * *